United States Patent
Andoh

(10) Patent No.: US 8,473,102 B2
(45) Date of Patent: Jun. 25, 2013

(54) ROBOT CONTROLLER, ROBOT CONTROL METHOD, AND LEGGED ROBOT

(75) Inventor: Fukashi Andoh, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/129,982

(22) PCT Filed: Feb. 26, 2010

(86) PCT No.: PCT/JP2010/001308
§ 371 (c)(1),
(2), (4) Date: May 18, 2011

(87) PCT Pub. No.: WO2010/122705
PCT Pub. Date: Oct. 28, 2010

(65) Prior Publication Data
US 2011/0224827 A1  Sep. 15, 2011

(30) Foreign Application Priority Data
Apr. 22, 2009 (JP) ................................. 2009-103917

(51) Int. Cl.
*G05B 19/18* (2006.01)

(52) U.S. Cl.
USPC ............... 700/253; 700/245; 700/250; 901/1

(58) Field of Classification Search
USPC ...... 700/245, 250, 253, 254, 255, 258; 901/1, 901/50; 318/568.12
See application file for complete search history.

(56) References Cited

U.S. PATENT DOCUMENTS

| | | | |
|---|---|---|---|
| 5,343,397 A | * | 8/1994 | Yoshino et al. .................. 701/23 |
| 7,029,175 B2 | * | 4/2006 | Karaus et al. .................. 378/197 |
| 2008/0154430 A1 | * | 6/2008 | Nakamura et al. ............ 700/259 |

FOREIGN PATENT DOCUMENTS

| | | |
|---|---|---|
| JP | 05-011839 A | 1/1993 |
| JP | 2001-150370 A | 6/2001 |
| JP | 2003-094358 A | 4/2003 |
| JP | 2003-145458 A | 5/2003 |
| JP | 2005-052897 A | 3/2005 |
| JP | 3655056 | 3/2005 |
| JP | 2005-088189 A | 4/2005 |
| JP | 2006-082142 A | 3/2006 |
| JP | 2006-167841 A | 6/2006 |
| JP | 2007-175831 A | 7/2007 |
| JP | 2008-149436 A | 7/2008 |

* cited by examiner

*Primary Examiner* — Khoi Tran
*Assistant Examiner* — Spencer Patton
(74) *Attorney, Agent, or Firm* — Kenyon & Kenyon LLP

(57) ABSTRACT

A robot controller in accordance with the present invention is a robot controller that makes a robot including a plurality of legs walk by driving joints of the robot, the robot controller being configured to determine a permissible range for a trunk vertical position of the robot based on measured environmental parameters, the measured environmental parameters being information of an environment around the robot, and to make the robot walk based on measured posture parameters representing a posture of the robot so that the trunk vertical position remains within the permissible range. In this way, a legged robot with high robustness as well as its controller and control method can be provided.

20 Claims, 7 Drawing Sheets

ROBOT CONTROLLER, ROBOT CONTROL METHOD, AND LEGGED ROBOT

This is a 371 national phase application of PCT/JP2010/001308 filed 26 Feb. 2010, claiming priority to Japanese Patent Application No. JP 2009-103917 filed 22 Apr. 2009, the contents of which are incorporated herein by reference.

TECHNICAL FIELD

The present invention relates to a robot controller, a robot control method, and a legged robot.

BACKGROUND ART

In recent years, legged robots have been developed (Patent literatures 1 and 2). The control technique disclosed in Patent literature 1 generates gait patterns in which the angle of each joint is expressed as a time series so that the knee angular speed remains in a restricted range. Then, the motion of the robot is controlled in accordance with the gait patterns (for example, see Patent literature 1).

Further, the robot controller disclosed in Patent literature 2 controls the motion of a robot in such a manner that the measured upper body position, the measured posture trajectory, the measured foot position, the measured foot posture trajectory, the measured floor reaction point, and the measured floor reaction force converge to their target values (for example, see Patent literature 2).

CITATION LIST

Patent Literature

Japanese Unexamined Patent Application Publication No. 2005-88189 (page 14, FIG. 2) Japanese Patent No. 3655056 (page 18, FIG. 4). Hereinafter, Japanese Unexamined Patent Application Publication No. 2005-88189 is Patent Literature 1, and Japanese Patent No. 3655056 is Patent Literature 2.

SUMMARY OF INVENTION

Technical Problem

The control method disclosed in Patent literature 1 is explained with reference to FIG. 6. In FIG. 6, the sign 601 represents a toe trajectory calculator; 602 represents a waist trajectory calculator; 603 represents a knee angle calculator; and 604 represents a calculator for knee angular speed range.

The toe trajectory calculator 601 calculates a toe trajectory by interpolation based on the initial coordinates, intermediate coordinates, and final coordinates of each of the left and right toes on a step-by-step basis, and outputs the calculated toe trajectory. The waist trajectory calculator 602 calculates a waist trajectory based on the toe trajectory so that the position of the center of gravity of the waist passes through the middle point between the centers of the left and right toes, and outputs the calculated waist trajectory.

The knee angle calculator 603 calculates and outputs a knee angle as a function of a predetermined walking speed and time. The calculator for knee angular speed range 604 establishes a restricted range of a physical quantity relating to the motion of the knee joints. The toe trajectory, the waist trajectory, the knee angle, and the restricted range are used as the initial conditions to generate gait patterns. Then, by going through the steps S601 to S604, the gait patterns are generated based on these initial conditions. In the step S601, a decision on standing leg and idling leg is made by using the initial conditions. In the step S602, the initial conditions are changed so that the initial conditions of the standing leg do not exceed the restricted range, and the waist height of the standing leg is calculated.

In the step S603, the angle of each joint is calculated based on the initial conditions and the waist height calculated in the step S603. In the step S604, the completion of the calculation for one walking cycle is confirmed and the gait patterns are determined. In this way, the control method disclosed in Patent literature 1 controls the motion of the robot in accordance with the gait patterns.

The control method disclosed in Patent literature 2 is explained with reference to FIG. 7. In FIG. 7, the sign 701 represents a robot leg controller; 702 represents leg actuators; 703 represents leg actuator position sensors; 704 represents a six-axis force sensor; and 705 represents an inclination sensor.

The robot leg controller 701 calculates a target upper body position, a target posture trajectory, a target foot position, a target foot posture trajectory, a target floor reaction point, and a target floor reaction force. Then, it outputs such a reference input that the measured upper body position calculated based on the actual positions, the measured foot reaction force, and the measured upper body posture parameters converges to the target upper body position, and that the measured posture trajectory, the measured foot position, the measured foot posture trajectory, the measured floor reaction point, and the measured floor reaction force converge to their target values.

The leg actuators 702 operate in accordance with the reference input. The leg actuator position sensors 703 measure and output the actual positions. The six-axis force sensor 704 measures and outputs the foot reaction force. The inclination sensor 705 measures and outputs the upper body posture parameters.

The control method disclosed in Patent literature 2 controls the motion of a robot so that the measured upper body position, the measured posture trajectory, the measured foot position, the measured foot trajectory, the measured floor reaction point, and the measured floor reaction force converge to their target values.

In the robot control methods above, a robot is controlled so that each leg joint of the robot moves along an ideal joint trajectory calculated in advance, and thereby making the robot walk. Therefore, depending on disturbances and ground conditions, there is a possibility that the robot could tumble down when each joint is moved along the joint trajectory.

Further, in order to make the robot walk in various environments and in various postures, it is necessary to calculate gait patterns for each environment and each posture. Further, it is also necessary to store the gate pattern data in a memory. As a result, the robot requires a huge memory capacity, thus causing a general technical problem that the robot cannot be constructed at low costs. To solve this general technical problem, it is desirable to develop a control method that allows a robot to walk without tumbling down even in the presence of various disturbances and/or in various ground conditions even when the robot is equipped with only a low-cost memory having a small capacity. As described above, there has been a need for a legged robot that works under relatively harsh environmental conditions.

The present invention has been made in view of the above-described problems, and an object thereof is to provide a robot controller, a robot control method, and a legged robot that works under relatively harsh environmental conditions.

Solution to Problem

A robot controller in accordance with the first aspect of the present invention is a robot controller that drives joints of a robot having a plurality of legs to make the robot walk, the robot controller being configured to: determine a permissible range for a trunk vertical position of the robot based on measured environmental parameters, the measured environmental parameters being information of an environment around the robot; and make the robot walk based on measured posture parameters representing a posture of the robot so that the trunk vertical position remains within the permissible range. In this way, the robustness of gait motions can be improved.

A robot controller in accordance with the second aspect of the present invention is the above-described robot controller, including: a thigh angular speed controller that controls a thigh angular speed of the robot; a knee absolute angle controller that controls a knee absolute angle of the robot; and an idling-leg angle controller that controls an idling-leg angle of the robot. In this way, the robustness of gait motions can be improved.

A robot controller in accordance with the third aspect of the present invention is the above-described robot controller, further including: a thigh angular speed reference input generator that generates a thigh angular speed reference input; and a trunk vertical position reference input generator that generates a trunk vertical position reference input based on the measured environmental parameters and the measured posture parameters, the trunk vertical position reference input being a target value of the trunk vertical position of the robot. In this way, the robustness of gait motions can be improved.

A robot controller in accordance with the fourth aspect of the present invention is the above-described robot controller, wherein a linear-part torque used to control a linear part of a robot mechanism is calculated, the robot mechanism being a mechanism of the robot. In this way, the robustness of gait motions can be improved.

A robot controller in accordance with the fifth aspect of the present invention is the above-described robot controller, wherein the linear-part torque includes a linear part of ankle torque used to control a thigh angular speed of the robot, a linear part of knee torque used to control a knee absolute angle of the robot, and a linear part of idling-leg torque used to control an idling-leg angle of the robot. In this way, the robustness of gait motions can be improved.

A robot controller in accordance with the sixth aspect of the present invention is the above-described robot controller, further including an environment sensor that outputs the measured environmental parameters. In this way, appropriate measured environmental parameters can be obtained and the robustness of gait motions can be thereby improved.

A robot controller in accordance with the seventh aspect of the present invention is the above-described robot controller, wherein the measured environmental parameters include a position of an obstacle located above the robot and a ground temperature. In this way, it is possible to make the robot walk while avoiding an obstacle located above the robot and protecting the electrical unit against the heat from the ground. In this way, it is possible to perform gait control according to the position of an obstacle and the ground temperature.

A robot controller in accordance with the eighth aspect of the present invention is the above-described robot controller, the robot controller being further configured to: set an upper bound of a permissible range of the trunk vertical position according to a position of an obstacle located above the robot, and set a lower bound of the permissible range of the trunk vertical position according to a ground temperature; set a trunk vertical position reference input to the lower bound when the trunk vertical position is smaller than the lower bound, the trunk vertical position reference input being a target value of the trunk vertical position of the robot; set the trunk vertical position reference input to the upper bound when the trunk vertical position is larger than the upper bound; and set the trunk vertical position reference input to the trunk vertical position when the trunk vertical position is within the permissible range. In this way, it is possible to make the robot walk while avoiding an obstacle located above the robot and protecting the electrical unit against the heat from the ground.

A robot controller in accordance with the ninth aspect of the present invention is the above-described robot controller, further including a posture sensor that outputs the measured posture parameters. In this way, it is possible to perform reliable gait control, and the robustness of gait motions can be thereby improved.

A robot controller in accordance with the tenth aspect of the present invention is the above-described robot controller, wherein the measured posture parameters include a thigh angle, a knee angle, and an idling-leg angle of the robot. In this way, it is possible to perform reliable gait control, and the robustness of gait motions can be thereby improved.

A robot controller in accordance with the eleventh aspect of the present invention is the above-described robot controller, wherein a knee absolute angle reference input is a target value of a knee absolute angle, which is a sum of a thigh angle and a knee angle of the robot, and the knee absolute angle reference input is a function of the thigh angle of the robot. In this way, it is possible to perform reliable control, and the robustness of gait motions can be thereby improved.

A robot controller in accordance with the twelfth aspect of the present invention is the above-described robot controller, the robot controller being further configured to: obtain the knee absolute angle reference input by subtracting a product of a thigh length and the thigh angle of the robot from the trunk vertical position reference input; divide the subtracted value by a shank length; and apply an arccosine function to the divided value. In this way, it is possible to perform reliable control, and the robustness of gait motions can be thereby improved.

A robot controller in accordance with the thirteenth aspect of the present invention is the above-described robot controller, wherein the idling-leg angle reference input, which is a target value of an idling-leg angle of the robot, is a function of the thigh angle of the robot. In this way, it is possible to perform reliable gait control, and the robustness of gait motions can be thereby improved.

A robot controller in accordance with the fourteenth aspect of the present invention is the above-described robot controller, wherein the idling-leg angle reference input is obtained by reversing a sign of the thigh angle. In this way, it is possible to perform reliable control, and the robustness of gait motions can be thereby improved.

A robot in accordance with the fifteenth aspect of the present invention includes the above-described robot controller and a plurality of legs. In this way, it is possible to provide a robot that works under relatively harsh environmental conditions.

A robot control method in accordance with the sixteenth aspect of the present invention is a robot control method to drive joints of a robot having a plurality of legs to make the robot walk, the robot control method including: determining a permissible range for a trunk vertical position of the robot based on measured environmental parameters, the measured environmental parameters being information about an environment around the robot; and making the robot walk based on measured posture parameters representing a posture of the robot so that the trunk vertical position remains within the permissible range. In this way, the robustness of gait motions can be improved.

A robot control method in accordance with the seventeenth aspect of the present invention is the above-described robot control method, further including generating a trunk vertical position reference input based on the measured environmental parameters and the measured posture parameters, the trunk vertical position reference input being a target value of the trunk vertical position of the robot. In this way, the robustness of gait motions can be improved.

A robot control method in accordance with the eighteenth aspect of the present invention is the above-described robot control method, wherein a linear-part torque used to control a linear part of a robot mechanism is calculated, the robot mechanism being a mechanism of the robot. In this way, the robustness of gait motions can be improved.

A robot control method in accordance with the nineteenth aspect of the present invention is the above-described robot control method, wherein the linear-part torque includes a linear part of ankle torque used to control a thigh angular speed of the robot, a linear part of knee torque used to control a knee absolute angle of the robot, and a linear part of idling-leg torque used to control an idling-leg angle of the robot. In this way, the robustness of gait motions can be improved.

A robot control method in accordance with the twentieth aspect of the present invention is the above-described robot control method, wherein the measured environmental parameters include a position of an obstacle located above the robot and a ground temperature. In this way, it is possible to perform gait control according to the position of an obstacle and the ground temperature.

A robot control method in accordance with the 21st aspect of the present invention is the above-described robot control method, further including: setting an upper bound of a permissible range of the trunk vertical position according to a position of an obstacle located above the robot, and setting a lower bound of the permissible range of the trunk vertical position according to a ground temperature; setting a trunk vertical position reference input to the lower bound when the trunk vertical position is smaller than the lower bound, the trunk vertical position reference input being a target value of the trunk vertical position of the robot; setting the trunk vertical position reference input to the upper bound when the trunk vertical position is larger than the upper bound; and setting the trunk vertical position reference input to the trunk vertical position when the trunk vertical position is within the permissible range. In this way, it is possible to make the robot walk while avoiding an obstacle located above the robot and protecting the electrical unit against the heat from the ground.

A robot control method in accordance with the 22nd aspect of the present invention is the above-described robot control method, wherein the measured posture parameters include a thigh angle, a knee angle, and an idling-leg angle of the robot. In this way, it is possible to perform reliable gait control, and the robustness of gait motions can be thereby improved.

A robot control method in accordance with the 23rd aspect of the present invention is the above-described robot control method, wherein a knee absolute angle reference input is a target value of a knee absolute angle, which is a sum of a thigh angle and a knee angle of the robot, and the knee absolute angle reference input is a function of the thigh angle of the robot. In this way, it is possible to perform reliable gait control, and the robustness of gait motions can be thereby improved.

A robot control method in accordance with the 24th aspect of the present invention is the above-described robot control method, further including: obtaining the knee absolute angle reference input by subtracting a product of a thigh length and the thigh angle of the robot from the trunk vertical position reference input; dividing the subtracted value by a shank length; and applying an arccosine to the divided value. In this way, it is possible to perform reliable gait control, and the robustness of gait motions can be thereby improved.

A robot control method in accordance with the 25th aspect of the present invention is the above-described robot control method, wherein the idling-leg angle reference input, which is a target value of an idling-leg angle of the robot, is a function of the thigh angle of the robot. In this way, it is possible to perform reliable gait control, and the robustness of gait motions can be thereby improved.

A robot control method in accordance with the 26th aspect of the present invention is the above-described robot control method, wherein the idling-leg angle reference input is obtained by reversing a sign of the thigh angle. In this way, it is possible to perform reliable gait control, and the robustness of gait motions can be thereby improved.

Advantageous Effects of Invention

In accordance with the present invention, it is possible to provide a robot controller, a robot control method, and a legged robot that works under relatively harsh environmental conditions.

DESCRIPTION OF EMBODIMENTS

Exemplary embodiments of a legged robot and its controller in accordance with the present invention are explained hereinafter with reference to the drawings. However, the present invention is not limited to the following exemplary embodiments. Further, the following description and the drawings are simplified as appropriate for clarifying the explanation.

A legged moving robot (hereinafter, simply called "robot") in accordance with an exemplary embodiment of the present invention is explained hereinafter with reference to FIG. 1.

Figure 1:
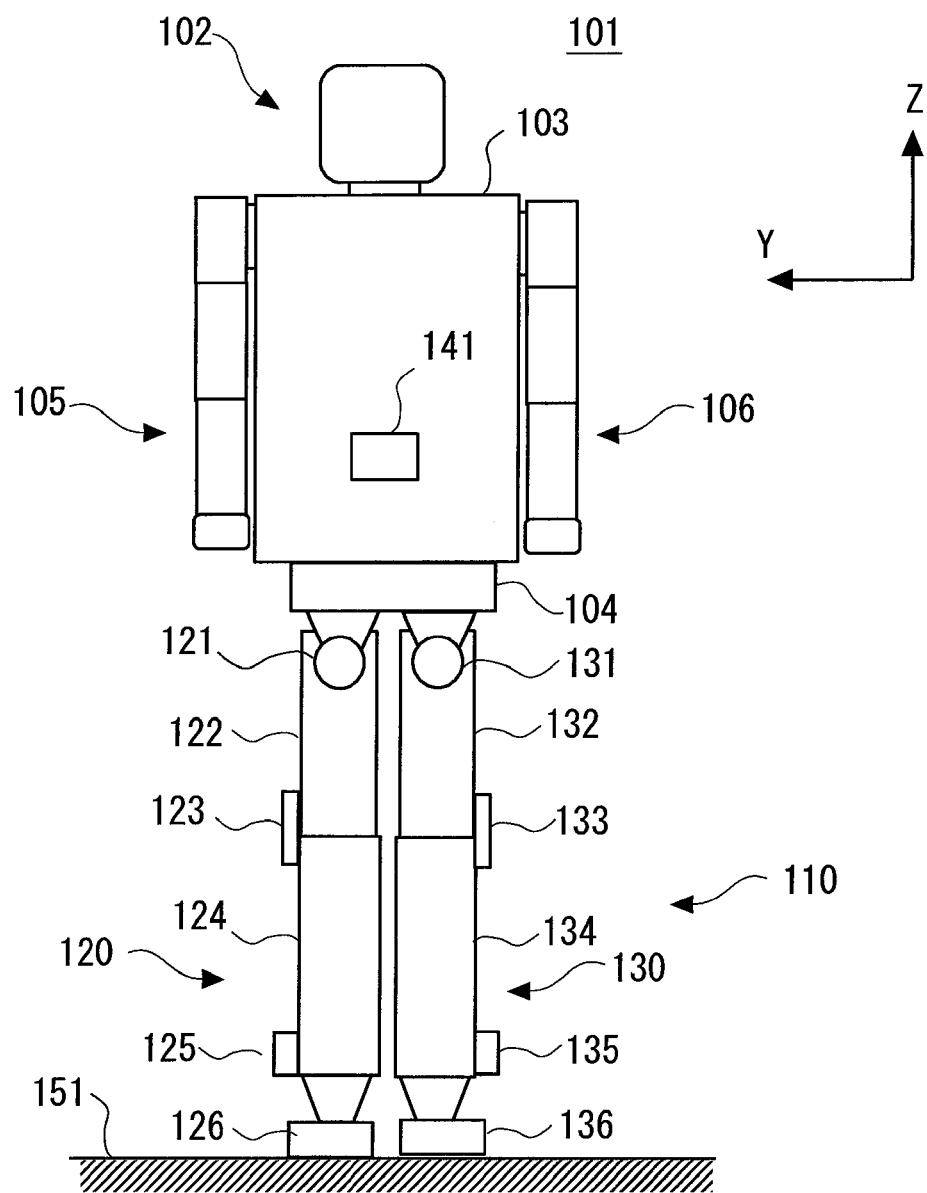
FIG. 1 is schematically shows a configuration of a robot in accordance with an exemplary embodiment of the present invention.

FIG. 1 is a front view of a robot 101 walking on a floor surface 151. It must be noted that, the traveling direction of the robot 101 (forward/backward direction) is defined as "X-axis"; the traverse direction with respect to the robot 101 (left/right direction) is defined as "Y-axis"; and the vertical direction (upward/downward) is defined as "Z-axis". That is, in FIG. 1, the X-axis goes into the paper surface; the Y-axis goes from right to left on the paper surface; and the Z-axis goes from bottom to top on the paper surface.

As shown in FIG. 1, the robot 101 is a biped robot including a head 102, a trunk (body) 103; a waist 104 that is a part of the trunk 103; a right arm 105 and a left arm 106 connected to the trunk 103; and legs 110 that are rotatably attached to the waist 104. The details are explained hereinafter.

The head 102 includes a pair of left and right image-capturing units (not shown) used to capture a visual image of the environment, and captures a wide image of the environment by turning the head 102 horizontally. The captured image data of the environment is sent to a control unit 141 (which is described later) and used as information to determine the motion of the robot 101.

The trunk 103 contains the control unit 141 that controls the motion of the robot 101, a battery (not shown) that supplies an electric power to the motors of the movable parts. The control unit 141 includes an arithmetic processing unit and a motor driving unit that drives the motors installed in the legs 110. The configuration of the control unit 141 is described later. Each of these components is supplied with an electric power from the battery (not shown) provided inside the trunk 103 for its operation.

Further, the arithmetic processing unit reads out a program stored in a storage area, and calculates required joint angles of the legs 110 to achieve the posture of the robot 101 specified by the program. Then, the arithmetic processing unit sends signals based on these calculated joint angles to the motor driving units.

The motor driving units specify driving amounts of the respective motors to drive the legs based on signals sent from the arithmetic processing unit, and send motor drive signals to drive the motors by these driving amounts. In this way, the driving amount at each joint of the legs 110 is adjusted, and the motion of the robot 101 is thereby controlled.

Further, in addition to instructing the motor driving units to drive the motors based on the read program, the arithmetic processing unit receives signals from sensors (not shown) such as a gyroscopic sensor, an accelerometer, and a rotary encoder embedded in the robot 101 and adjusts the driving amounts of the motors. By adjusting the joint angles of the legs 110 according to an external force acting on the robot 101 measured by the sensor, and the posture of the robot 101 in this manner, it is possible to maintain the robot 101 in a stable state.

The right arm 105 and the left arm 106 are rotatably connected to the trunk 103, and they can perform similar motions to those of human arms by driving joints located at the elbows and the wrists. Further, each hand, which is connected to the tip of the respective wrist, is equipped with a hand structure used to grasp an object (omitted in the figure), and thereby can grasp objects having various shapes by driving a plurality of finger joints embedded in the hand structure.

The waist 104 is connected to the body portion of the trunk 103 in such a manner that the waist 104 can rotate with respect to the body portion of the trunk 103. Therefore, when the robot performs a gait motion, it is possible to reduce the driving energy necessary to drive the legs 110 by combining the rotational movement of the waist 104.

The legs 110, which are provided to perform bipedal walking, are composed of a right leg 120 and a left leg 130. More particularly, as shown in FIG. 1, the right leg 120 consists of a right hip joint 121, a right thigh 122, a right knee joint 123, a right shank (right shin) 124, a right ankle joint 125, and a right foot 126. Similarly, the left leg 130 consists of a left hip joint 131, a left thigh 132, a left knee joint 133, a left shank (left shin) 134, a left ankle joint 135, and a left foot 136.

Then, in each of the right leg 120 and the left leg 130, a driving force is transmitted from a motor (not shown) through a pulley(s) and a belt(s) (also not shown), so that each joint is driven to a desired angle. As a result, it is possible to make the legs perform a desired motion.

Hereinafter, the control unit 141 is explained in detail. The control unit 141 includes a CPU (Central Processing Unit), a ROM (Read Only Memory), a RAM (Random Access Memory), a communication interface, and controls various motions of the robot 101. For example, control programs, various configuration data, are stored in the ROM. Then, the CPU reads a control program stored in the ROM, and extends it in the RAM. Further, the RAM also executes a program according to the configuration data, and outputs from sensors.

Figure 2:
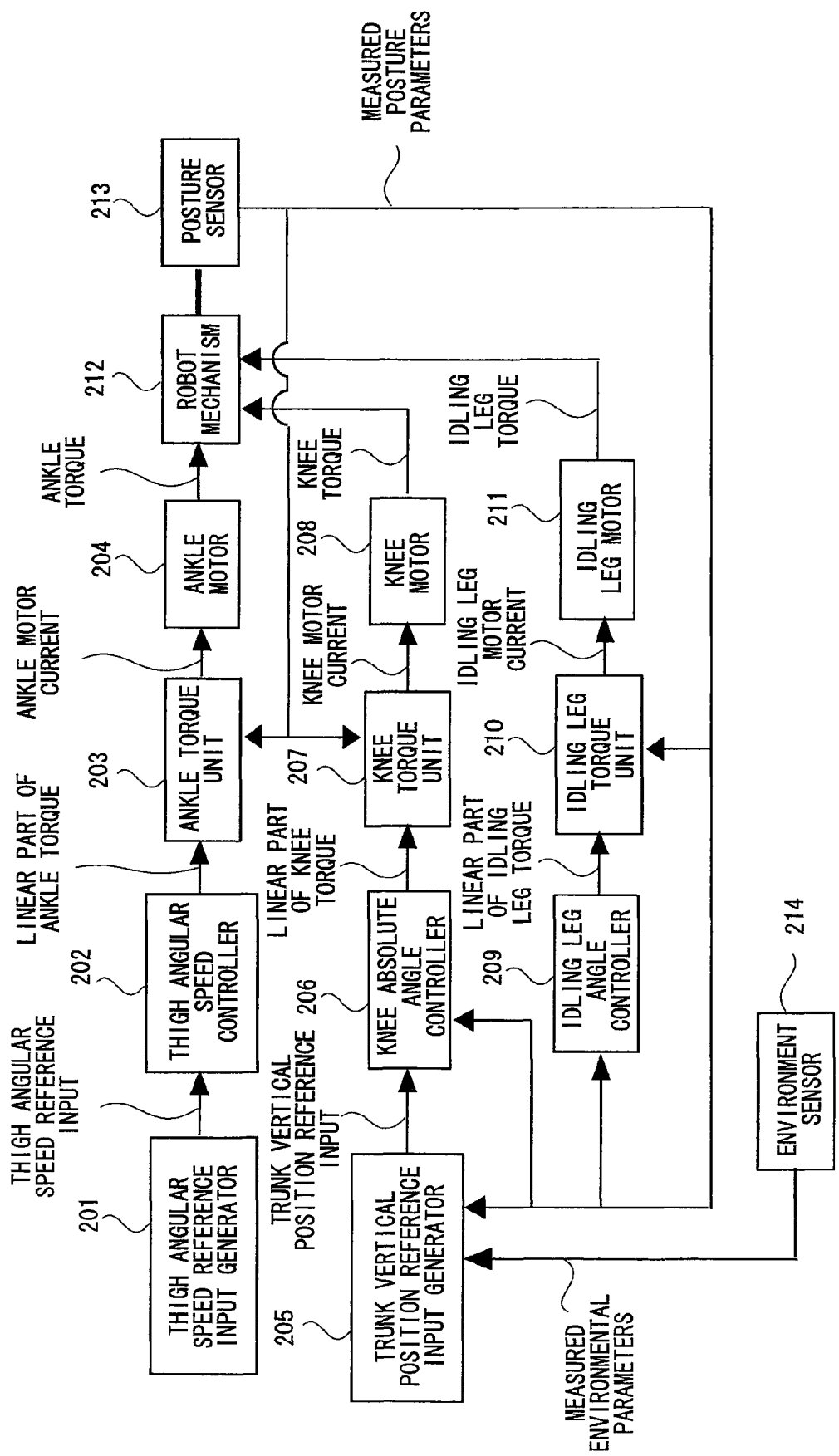
FIG. 2 is a block diagram showing a controller of a robot in accordance with an exemplary embodiment of the present invention.

Next, the configuration of the control unit 141 used to control a gait motion is explained with reference to FIG. 2. FIG. 2 is a block diagram showing a configuration of the control unit 141. Therefore, FIG. 2 shows a robot controller that controls the motions of a robot. It must be noted that the following explanation is made with emphasis on the gait control of the robot 101.

In FIG. 2, the sign 201 represents a thigh angular speed reference input generator; 202 represents a thigh angular speed controller; 203 represents an ankle torque unit; 204 represents an ankle motor; 205 represents a trunk vertical position reference input generator; 206 represents a knee absolute angle controller; 207 represents a knee torque operator; 208 represents a knee motor; 209 represents an idling-leg angle controller; 210 represents an idling-leg torque unit; 211 represents an idling-leg motor; 212 represents a robot mechanism; 213 represents a posture sensor; and 214 represents an environment sensor.

The thigh angular speed reference input generator 201 outputs a thigh angular speed reference input, which is the target value of the thigh angular speed $d\theta_h/dt$. The thigh angular speed reference input is determined according to the gait speed of the robot 101. The thigh angular speed controller 202 calculates a linear part of ankle torque, which is a component of an ankle torque for a linear part of the robot mechanism 212 and outputs the linear part of ankle torque. With this linear part of ankle torque, the thigh angular speed is controlled so as to track the thigh angular speed reference input.

The ankle torque unit 203 feeds an ankle motor current to the ankle motor 204 based on the linear part of ankle torque and measured posture parameters. It must be noted that the measured posture parameters include each joint angle of the robot mechanism 212. The ankle motor 204 generates an ankle torque based on the ankle motor current, and thereby drives the ankle of the robot mechanism 212. It must be noted that the robot mechanism 212 includes a mechanism to operate each joint.

The trunk vertical position reference input generator 205 calculates a trunk vertical position reference input based on measured posture parameters and measured environmental parameters and outputs the trunk vertical position reference input. The trunk vertical position reference input is the target value of the trunk vertical position, which is the vertical position of the trunk at which the robot mechanism 212 can safely operate. That is, the joints included in the robot mechanism 212 operate so that the trunk vertical position tracks the trunk vertical position reference input. The knee absolute angle controller 206 calculates a linear part of knee torque based on the trunk vertical position reference input and the measured posture parameters and outputs the linear part of knee torque. The linear part of knee torque is a component of a knee torque for a linear part of the robot mechanism 212 that is used to control a knee absolute angle. The knee absolute angle is the sum of the thigh angle and the knee angle. In this way, the trunk vertical position of the robot mechanism 212 is controlled so as to track the trunk vertical position reference input.

The knee torque unit 207 feeds a knee motor current to the knee motor 208 based on the linear part of knee torque and the measured posture parameters. The knee motor 208 generates a knee torque based on the knee motor current, and thereby drives the knee of the robot mechanism 212.

The idling-leg angle controller 209 calculates an idling-leg angle reference input based on the measured posture parameters. The idling-leg angle reference input is the target value of the idling-leg angle of the robot mechanism 212. Further, the idling-leg angle controller 209 calculates a linear part of idling-leg torque, which is a component of an idling-leg torque for a linear part of the robot mechanism 212 and outputs the linear part of idling-leg torque. In this way, the idling-leg angle is controlled so as to track the idling-leg angle reference input. The idling-leg angle reference input may be a function of the thigh angle of the robot 101. The idling-leg angle reference input may be obtained by reversing the sign of the thigh angle. That is, the idling-leg angle may be controlled in such a manner that the idling leg and the standing leg move symmetrically.

The idling-leg torque unit 210 feeds an idling-leg motor current to the idling-leg motor 211 based on the linear part of idling-leg torque and the measured posture parameters. The robot mechanism 212 is driven by the ankle torque, the knee torque, and the idling-leg torque. That is, the driving motor of each joint is operated with a motor current supplied from the respective unit. Further, the posture sensor 213 connected to the robot mechanism 212 measures posture parameters and outputs the measured posture parameters. The posture sensor 213 includes, for example, an angle sensor(s) that measures the angle of each joint. Examples of the angle sensor include a resolver, a potentiometer, and an encoder. Further, sensors other than the angle sensor may be also used, provided that they can measure the posture. The posture sensor 213 may include, for example, an accelerometer that is not attached to the joint. With this posture sensor 213, the posture of the robot mechanism 212 is measured. That is, the posture of the robot is given by the rotation angle of each joint.

The environment sensor 214 measures information on the environment around the robot mechanism 212 (e.g., adjacent obstacles, and a temperature), and outputs the information as measured environmental parameters. The environment sensor 214 may consist of a temperature sensor that measures the temperature of the floor surface and an obstacle sensor that measures the height of an obstacle.

It must be noted that the environment sensor 214 may be externally disposed in a place outside the robot 101. For example, a temperature sensor that measures the temperature of the environment and/or an obstacle sensor that measures the position of an obstacle may be provided in the environment in which the robot 101 travels. Then, the robot 101 may receive information on the environment from the external sensor(s). Further, the measured environmental parameters may dynamically change. That is, the measured environmental parameters may change while the robot 101 is walking. For example, when the temperature of the environment changes, the measured environmental parameters may change according to the temperature variation. Alternatively, the measured environmental parameters may change according to the distance to an obstacle. For example, the measured environmental parameters may change after the robot 101 passes through an obstacle. In order to dynamically recognize changes in the environment, the environment sensor 214 is preferably disposed inside the robot 101. In this way, appropriate measured environmental parameters can be obtained.

The details of the mechanism by which the control unit 141 in accordance with this exemplary embodiment drives the robot mechanism 212 are explained hereinafter with reference to FIG. 3.

Figure 3:
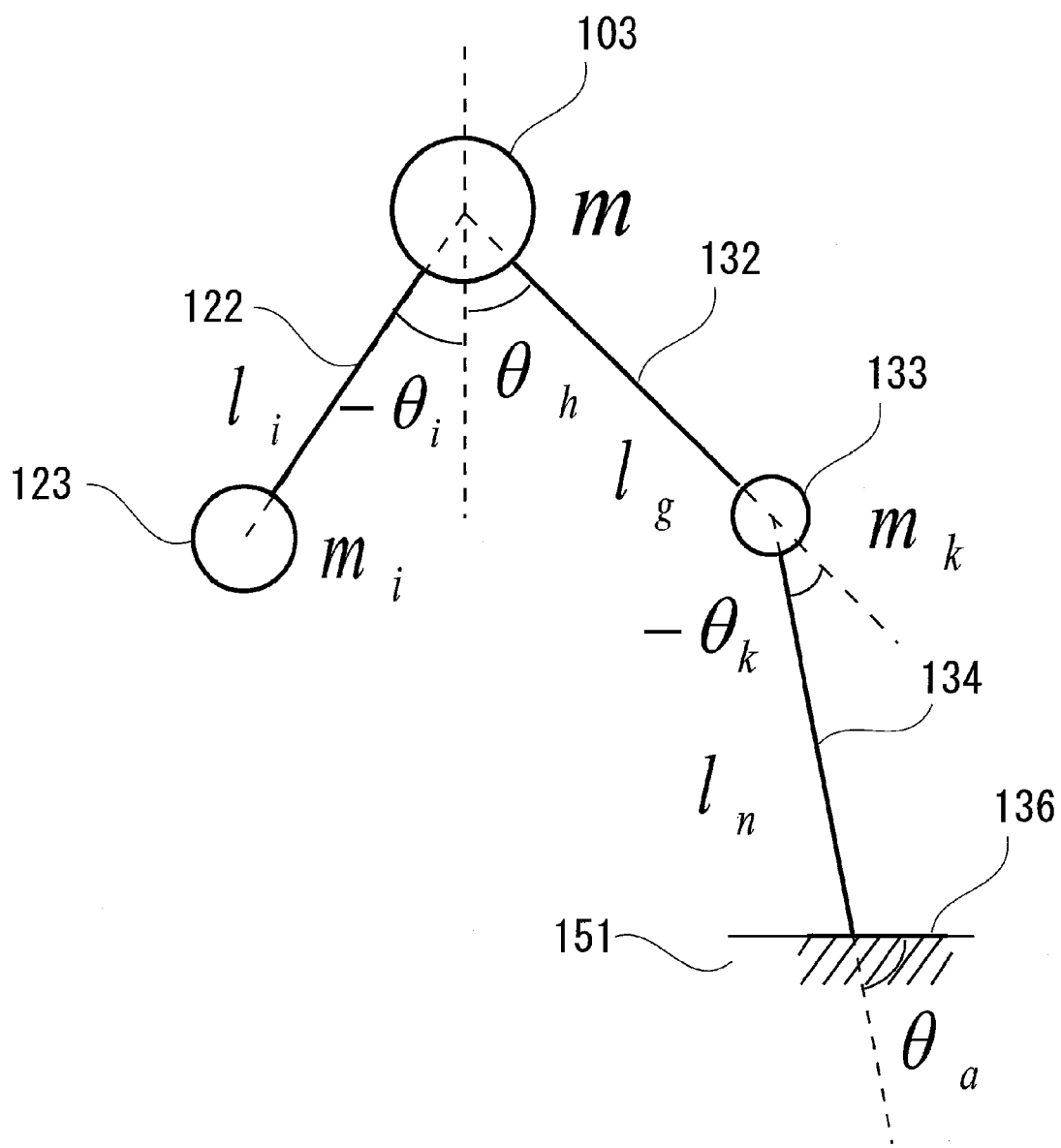
FIG. 3 is a diagram for explaining gait control of a robot in accordance with an exemplary embodiment of the present invention.

FIG. 3 schematically shows the robot mechanism 212 in accordance with this exemplary embodiment. In FIG. 3, the right leg is the idling leg and the left leg is the standing leg. In FIG. 3, a part of the idling leg is omitted. The sign $\theta_h$ represents thigh angle; $\theta_k$ represents knee angle; $\theta_a$ represents ankle angle; $\theta_i$ represents idling-leg angle; m represents trunk weight; $m_k$ represents knee weight; $m_i$ represents idling leg weight; $l_g$ represents thigh length; $l_n$ represents shank length (shin length); and $l_i$ represents idling-leg length. Further, for the thigh angle $\theta_h$, the knee angle $\theta_k$, and the ankle angle $\theta_a$, the counter clockwise direction is defined as the positive direction. The equation of motion of the robot mechanism shown in FIG. 3 is expressed in the following Equations (1), (2) and (3) by using Euler-Lagrange equation.

$$(m_k + m + m_i)l_n^2(\ddot{\theta}_h + \ddot{\theta}_k) + \qquad \text{[Equation 1]}$$
$$(m + m_i)[l_g^2\ddot{\theta}_h - l_n l_g \sin\theta_k \dot{\theta}_k \dot{\theta}_h + l_n l_g \cos\theta_k \ddot{\theta}_h -$$
$$l_n l_g \sin\theta_k \dot{\theta}_k(\dot{\theta}_h + \dot{\theta}_k) + l_n l_g \cos\theta_k(\ddot{\theta}_h + \ddot{\theta}_k)] +$$
$$m_i[-l_g l_i \sin(\theta_h + \theta_i)(\dot{\theta}_h + \dot{\theta}_i)\dot{\theta}_i + l_g l_i \cos(\theta_h + \theta_i)\ddot{\theta}_i -$$
$$l_i l_n \sin(\theta_i - \theta_h - \theta_k)(\dot{\theta}_i - \dot{\theta}_h - \dot{\theta}_k)\dot{\theta}_i +$$
$$l_i l_n \cos(\theta_i - \theta_h - \theta_k)\ddot{\theta}_i] -$$
$$m_i[-l_g l_i \sin(\theta_h + \theta_i)\dot{\theta}_h \dot{\theta}_i +$$
$$l_i l_n \sin(\theta_i - \theta_h - \theta_k)\dot{\theta}_i(\dot{\theta}_h + \dot{\theta}_k)] -$$
$$(m_k + m + m_i)gl_n \sin(\theta_h + \theta_k) -$$
$$(m + m_i)gl_g \sin\theta_h = T_a + T_k + w_a$$

$$(m_k + m + m_i)l_n^2(\ddot{\theta}_h + \ddot{\theta}_k) - \qquad \text{[Equation 2]}$$
$$(m + m_i)l_n l_g \sin\theta_k \dot{\theta}_k \dot{\theta}_h + (m + m_i)l_n l_g \cos\theta_k \ddot{\theta}_h -$$
$$m_i l_i l_n \sin(\theta_i - \theta_n - \theta_k)(\dot{\theta}_i - \dot{\theta}_n - \dot{\theta}_k)\dot{\theta}_i +$$
$$m_i l_i l_n \cos(\theta_i - \theta_n - \theta_k)\ddot{\theta}_i + (m + m_i)l_n l_g \sin\theta_k(\dot{\theta}_h + \dot{\theta}_k)\dot{\theta}_h -$$
$$m_i l_i l_n \sin(\theta_i - \theta_h - \theta_k)\dot{\theta}_i(\dot{\theta}_h + \dot{\theta}_k) -$$
$$(m_k + m + m_i)gl_n \sin(\theta_h + \theta_k) = T_k$$

$$m_i[l_i^2\ddot{\theta}_i - l_g l_i \sin(\theta_h + \theta_i)(\dot{\theta}_h + \dot{\theta}_i)\dot{\theta}_h + l_g l_i \cos(\theta_h + \theta_i)\ddot{\theta}_h - \qquad \text{[Equation 3]}$$
$$l_i l_n \sin(\theta_i - \theta_h - \theta_k)(\dot{\theta}_i - \dot{\theta}_h - \dot{\theta}_k)(\dot{\theta}_h + \dot{\theta}_k) +$$
$$l_i l_n \cos(\theta_i - \theta_h - \theta_k)(\ddot{\theta}_h + \ddot{\theta}_k)] +$$
$$m_i[l_g l_i \sin(\theta_h + \theta_i)\dot{\theta}_h \dot{\theta}_i + l_i l_n \sin(\theta_i - \theta_h - \theta_k)\dot{\theta}_i(\dot{\theta}_h + \dot{\theta}_k)] +$$
$$m_i g l_i \sin\theta_i = T_a + T_k + T_i + w_a$$

It must be noted that the sign g represents gravitational acceleration; $T_a$ represents ankle torque (which is the torque acting to rotate the left foot 136 with respect to the left knee joint 133); $T_k$ represents knee torque (which is the torque acting to rotate the left shank 134 with respect to the left thigh 132); $T_i$ represents idling-leg torque (which is the torque acting to rotate the idling leg with respect to the trunk 103); and $w_a$ represents torque disturbance exerted on the ankle. It must also be noted that for the ankle torque $T_a$, the knee torque $T_k$, and the idling-leg torque $T_i$, the counter clockwise direction is defined as the positive direction.

Letting $g_h$, $g_k$ and $g_i$ be the left-hand side non-linear terms of Equations (1), (2) and (3) respectively, the ankle torque $T_a$, the knee torque $T_k$, and the idling-leg torque $T_i$ are rewritten as the following Equations (4), (5) and (6).

$$T_a = T_{a0} + g_h g_k \quad \text{[Equation 4]}$$

$$T_k = T_{k0} + g_k \quad \text{[Equation 5]}$$

$$T_i = T_{i0} + g_i - g_h \quad \text{[Equation 6]}$$

Note that $T_{a0}$ is the linear part of ankle torque; $T_{k0}$ is the linear part of knee torque; and $T_{a0}$ is the linear part of idling-leg torque. By substituting Equations (4), (5) and (6) into Equations (1), (2) and (3), the following Equations (7), (8) and (9) are obtained.

$$(m_k + m + m_i) l_n^2 (\ddot{\theta}_h + \ddot{\theta}_k) + (m + m_i) l_g^2 \ddot{\theta}_h = T_{a0} + T_{k0} + w_a \quad \text{[Equation 7]}$$

$$(m_k + m + m_i) l_n^2 (\ddot{\theta}_h + \ddot{\theta}_k) = T_{k0} \quad \text{[Equation 8]}$$

$$m_i l_i^2 \ddot{\theta}_i = T_{a0} + T_{k0} + T_{i0} + w_a \quad \text{[Equation 9]}$$

Rewriting Equation (7) with Equation (8), the following Equation (10) is obtained.

$$(m + m_i) l_g^2 \ddot{\theta}_h = T_{a0} + w_a \quad \text{[Equation 10]}$$

Rewriting Equation (8) with the knee absolute angle $\theta_{hk} = \theta_h + \theta_k$, which is the sum of the thigh angle $\theta_h$ and the knee angle $\theta_k$, the following Equation (11) is obtained.

$$(m_k + m + m_i) l_n^2 \ddot{\theta}_{hk} = T_{k0} \quad \text{[Equation 11]}$$

The thigh angular speed reference input generator 201 generates a thigh angular speed reference input $V_h$, which is the target value of the thigh angular speed $d\theta_h/dt$ and outputs the thigh angular speed reference input $V_h$. The thigh angular speed controller 202 calculates the linear part of ankle torque $T_{a0}$ based on Equation (10) so that the following Equation (12) is satisfied.

$$\lim_{t \to \infty} \dot{\theta}_h = v_h \quad \text{[Equation 12]}$$

The ankle torque operator 203 calculates the ankle torque $T_a$ based on the linear part of ankle torque $T_{a0}$ and Equation (4). The ankle torque operator 203 calculates an ankle motor current having such a current value that the ankle motor 204 generates the ankle torque $T_a$ and outputs the ankle motor current.

The trunk vertical position reference input generator 205 calculates a permissible range (target range) of the trunk vertical position y based on environmental information around the robot mechanism 212 (e.g., adjacent obstacles, and a temperature) output by the environment sensor 214. The range of the trunk vertical position y is a range of the vertical position of the trunk 103 from the ground 151 within which the robot mechanism 212 can safely operate. The upper bound and the lower bound of the permissible range are defined as "trunk vertical position upper bound $y_{max}$" and "trunk vertical position lower bound $y_{min}$" respectively. As shown in the following Equation (13), the trunk vertical position y is calculated based on the measured posture parameters.

$$y = l_n \cos(\theta_h + \theta_k) + l_g \cos \theta_h \quad \text{[Equation 13]}$$

The trunk vertical position reference input generator 205 calculates a trunk vertical position reference input $r_y$, which is the target value of the trunk vertical position y, with the trunk vertical position upper bound $y_{max}$, the trunk vertical position lower bound $y_{min}$, and the trunk vertical position y as shown in the following Equation (14).

$$r_y = \begin{cases} y_{min} & y \leq y_{min} \\ y & y_{min} < y < y_{max} \\ y_{max} & y \geq y_{max} \end{cases} \quad \text{[Equation 14]}$$

When the trunk vertical position y is within the range wherein the robot mechanism 212 can safely operate, the trunk vertical position y is not controlled. In other words, the trunk vertical position is controlled so that the trunk vertical position reference input $r_y$ coincides with the prior value of the trunk vertical position y. When the trunk vertical position y becomes larger than the trunk vertical position upper bound $y_{max}$, it is brought closer to the trunk vertical position upper bound $y_{max}$. When the trunk vertical position y becomes smaller than the trunk vertical position lower bound $y_{min}$, it is brought closer to the trunk vertical position lower bound $y_{min}$. That is, each joint of the robot mechanism 212 is controlled so that the trunk vertical position y converges within the permissible range.

For example, when a rescue robot works under a scorching sun to rescue victims from a collapsed building, the rescue robot needs to pass under obstacles which are lower than the height of the rescue robot and, at the same time, needs to walk on the high-temperature ground. In order to extend the battery life of the rescue robot and to protect the electrical unit of the rescue robot from the heat from the ground, it is desirable to increase the trunk vertical position y. On the other hand, in order to pass under obstacles to rescue the victims, it is necessary to decrease the trunk vertical position y to prevent the robot from contacting the obstacles. That is, it is necessary to control the trunk vertical position so that the position of the head 102 and other body parts remain lower than the position of the obstacles. In this example, the measured environmental parameters are the ground temperature and the position (height) of the obstacle. The trunk vertical position lower bound $y_{min}$ is determined based on the temperature of the floor surface, and the trunk vertical position upper bound $y_{max}$ is determined based on the position of the obstacle.

Alternatively, the threshold may be determined according to the condition of the road surface. For example, when the floor surface is frozen, the robot could easily slip. Since the robot 101 could easily tumble down, the trunk vertical position upper bound $y_{max}$ may be established. In this way, it is possible to prevent a failure due to the tumbling-down. Further, when the floor surface is flooded, the trunk vertical position lower bound $y_{min}$ may be established so that the electrical unit of the robot 101 is prevented from getting wet. In this way, the failure of the robot 101 can be prevented. That is, it is possible to prevent the electrical components such as the battery and motors from getting wet, thus preventing the failure of the electrical components.

The knee absolute angle controller 206 calculates the linear part of knee torque $T_{k0}$ of Equation (11) with the trunk vertical position reference input $r_y$ and the measured posture parameters so that the following Equation (15) is satisfied and outputs the linear part of knee torque $T_{k0}$.

$$\lim_{t \to \infty} \theta_{hk} = \cos^{-1}\left(\frac{r_y - l_g \cos \theta_h}{l_n}\right) \quad \text{[Equation 15]}$$

The knee torque unit 207 calculates a knee torque $T_k$ by using the linear part of knee torque $T_{k0}$, the measured posture parameters, and Equation (5). The knee torque operator 207 calculates a knee motor current having such a current value that the knee motor 208 generates the knee torque $T_a$ and outputs the knee motor current.

The idling-leg angle controller 209 calculates an idling-leg angle reference input based on the measured posture parameters. The idling-leg angle reference input is the target value of the idling-leg angle $\theta_i$ with which the robot mechanism 212 can continue the walking. The idling-leg angle reference input may be a function of the thigh angle in the standing leg. Further, the idling-leg angle reference input may be obtained by reversing the sign of the thigh angle. The idling-leg angle controller 209 calculates the linear part of idling-leg torque $T_{i0}$ so that the idling-leg angle $\theta_i$ tracks the idling-leg angle reference input. That is, the idling-leg angle controller 209 calculates the linear part of idling-leg torque $T_{i0}$ of Equation (9) so that the following Equation (16) is satisfied and outputs the linear part of idling-leg torque $T_{i0}$.

$$\lim_{t \to \infty} \theta_i = -\theta_h \quad [\text{Equation 16}]$$

The idling-leg torque unit 210 calculates an idling-leg angle torque $T_i$ with the linear part of idling-leg torque $T_{i0}$, measured posture parameters, and Equation (6). Then, the idling-leg torque unit 210 calculates an idling-leg motor current having such a current value that the idling-leg motor 211 generates the idling-leg torque $T_i$ and outputs the idling-leg motor current.

As described above, the target range (permissible range) of the trunk vertical position y is set based on the environment around the robot. Then, feedback control is performed on the trunk vertical position y and the thigh angular speed $d\theta_h/dt$. When the trunk vertical position y is within the permissible range, the trunk vertical position y is not controlled. Therefore, the power consumption can be reduced and the battery life can be extended. Further, it is possible to safely operate the robot 101 without contacting surrounding objects or humans. As a result, the failure and damage of the robot 101 can be minimized. It must be noted that although the permissible range is set as a range between the upper bound and the lower bound in the above explanation, only the lower bound may be set. That is, the permissible range may be set as a range above the lower bound.

Further, in the above-described control, the target value of the trunk vertical position y has a range. That is, the feedback control is performed so that the trunk vertical position y falls within a permissible range having a certain width. Therefore, the above-described control has higher robustness against disturbances in comparison to the conventional method in which the motion control is performed so as to get closer to one target posture. Therefore, it is possible to make the robot walk with stability even on a rough ground and/or a moving ground. For example, when the trunk vertical position y exceeds the permissible range due to a disturbance, the feedback control is performed so as to swiftly return within the permissible range. Therefore, the robustness of gait motions can be improved.

In the above-described control, the motion control is performed while placing importance on the prevention of the tumbling-down of the robot. As a result, it is possible to keep the balance even when the ground is very rough. For example, when the place at which the standing leg landed is unstable and moves, and therefore when a large torque disturbance is caused on the ankle and thus the forward movement is impossible, it is still possible to keep the balance by moving the idling leg backward so that the robot is prevented from tumbling down.

It is possible to perform gait control by using any given linear control law such as P control, I-P control, and PID control, as well as any given non-linear control law such as sliding mode control on the thigh angular speed controller 202.

It is also possible to perform gait control using any given linear control law such as position P speed P control, position P speed PI control, position P speed I-P control, position P control, position PI control, position I-P control, and position PID control, as well as any given non-linear control law such as sliding mode control on the knee absolute angle controller 206 and the idling-leg angle controller 209.

In this exemplary embodiment, an example of bipedal walking is shown. However, the above-described control can be applied to the walking control of robots having any number of plural legs by appropriately changing Equation (16) representing the motion of the idling leg. For example, it is possible to control a robot having three or more legs.

The target value of the knee absolute angle, which is the sum of the thigh angle and the knee angle of the robot 101, may be used as the knee absolute angle reference input, and the knee absolute angle reference input may be a function of the thigh angle of the robot.

For example, a value is obtained by subtracting the product of the thigh length and the cosine of the thigh angle of the robot 101 from the trunk vertical position reference input. Then, the subtracted value is divided by the shank length. Then, the knee absolute angle reference input is obtained by calculating the arccosine of the divided value.

The idling-leg angle reference input, which is the target value of the idling-leg angle of the robot, may be a function of the thigh angle of the robot. The idling-leg angle reference input may be obtained by reversing the sign of the thigh angle.

Further, since the present invention is not required to store gait patterns in the memory, it is applicable to the gait control of robots equipped with only a low-cost memory having a small capacity.

The simulation result of the above-described control is shown below.

$m=30[kg]$, $m_k=10[kg]$, $m_i=10[kg]$, $l_n=0.5[m]$, $l_g=0.4[m]$, $l_i=0.5[m]$, $g=9.8[m/s^2]$, $J_t=(m+m_i) \cdot l_g\char`\^2$, $J_{hk}=(m_k+m+m_i) \cdot l_n\char`\^2$, $J_i=m_i \cdot l_i\char`\^2$, $T=10 \times 10\char`\^-3[s]$, $K_{vh}=10 \cdot (2\pi)$ $[s\char`\^-1]$, $K_{vjh}=K_{vh} \cdot J_t[N \cdot m \cdot s/rad]$, $K_{vhk}=10 \cdot (2\pi)[s\char`\^-1]$, $K_{vjhk}=K_{vhk} \cdot J_{hk}$ $[N \cdot m \cdot s/rad]$, $K_{phk}=10[s\char`\^-1]$, $K_{vi}=10 \cdot (2\pi)$ $[s\char`\^-1]$, $K_{vji}=K_{vi} \cdot J_i$ $[N \cdot m \cdot s/rad]$, $K_{pi}=10[s\char`\^-1]$, $A_{wa}=0.318[N \cdot m]$, $t_d=0.5[s]$, $v_h=-1.5/(l_g+l_n)$ $[rad/s]$, $qk_{min}=-175 \cdot \pi/180[rad]$, $q_{kmax}=-0.5\pi/180$ $[rad]$, $q_{hmin}=-60 \cdot \pi/180[rad]$, $q_{hmax}=90 \cdot \pi/180[rad]$, $q_{imin}=q_{hmin}[rad]$, $q_{imax}=q_{hmax}[rad]$, $y_{min}=0.8 \cdot (l_g+l_n)$ $[m]$, $y_{max}=0.9 \cdot (l_g+l_n)[m]$, $q_{hic}=50 \cdot \pi/180[rad]$, $v_{hic}=v_h[rad/s]$, $q_{kic}=-45 \cdot \pi/180[rad]$, $v_{kic}=0[rad/s]$, $q_{iic}=-q_{hic}[rad]$, $v_{iic}=-v_{hic}$ $[rad/s]$ It must be noted that m is trunk weight; $m_k$ is knee weight; $m_i$ is idling leg weight; $l_n$ is shank length; $l_g$ is thigh length; $l_i$ is idling leg length; $J_t$ is moment of inertia of trunk; $J_{hk}$ is moment of inertia of knee; $J_i$ is moment of inertia of idling leg; g is gravitational acceleration; T is sampling time; $K_{vh}$ is normalized thigh angular speed proportional control gain; $K_{vjh}$ is thigh angular speed proportional control gain; $K_{vhk}$ is normalized knee angular speed proportional control gain; $K_{vjhk}$ is knee angular speed proportional control gain; $K_{phk}$ is knee angle proportional control gain; $K_{vi}$ is normalized idling leg angular speed proportional control gain; $K_{vji}$ is idling leg angular speed proportional control gain; $K_{pi}$ is idling-leg angle proportional control gain; $A_{wa}$ is torque disturbance amplitude; $t_d$ is torque disturbance time; $v_h$ is thigh angular speed reference input; $qk_{min}$ is knee angle lower bound; $q_{kmax}$ is knee angle upper bound; $q_{hmin}$ is thigh angle lower bound;

$q_{hmax}$ is thigh angle upper bound; $q_{imin}$ is idling-leg angle lower bound; $q_{imax}$ is idling-leg angle upper bound; $y_{min}$ is trunk vertical position lower bound; $y_{max}$ is trunk vertical position upper bound; $c_{hic}$ is the initial condition of thigh angle; $v_{hic}$ is the initial condition of thigh angular speed; $q_{kic}$ is the initial condition of knee angle; $v_{kic}$ is the initial condition of knee angular speed; $q_{iic}$ is the initial condition of idling-leg angle; and $v_{iic}$ is the initial condition of idling leg angular speed.

In this simulation, the thigh angular speed controller 202 uses position P control, and the knee absolute angle controller 206 and the idling-leg angle controller 209 use position P speed P control. To show the robustness of the motion control in accordance with the present invention against disturbances, an impulse torque disturbance having an amplitude $A_{wa}$ is applied to the ankle in the counter clockwise direction at a time $t_d$. As for the movable range of each joint of the robot as well as initial conditions of their angles and angular speeds, the above-described values were used in this simulation.

Figure 4:
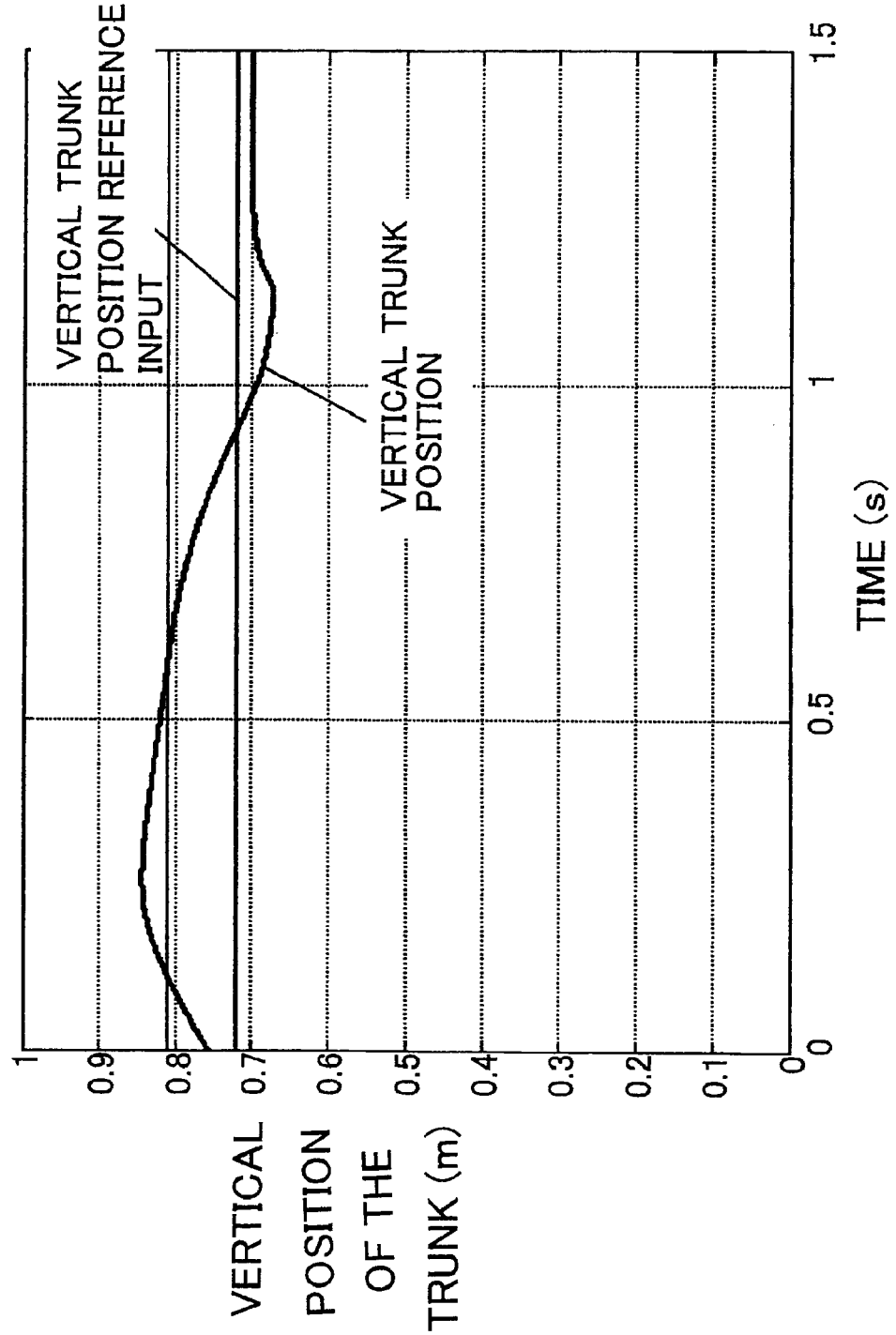
FIG. 4 shows a simulation result of a time history of the trunk vertical position in a gait motion of a robot.
Figure 5:
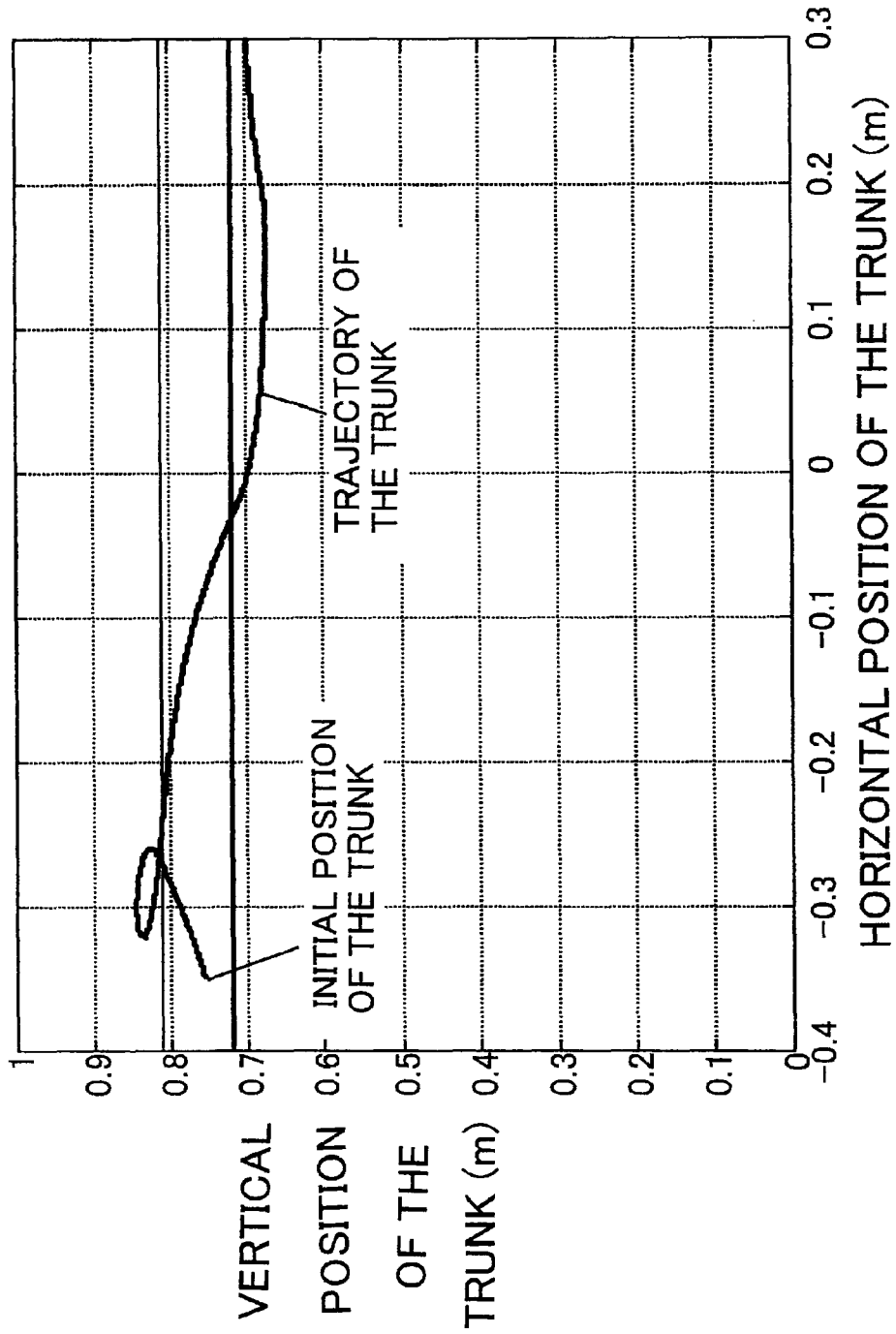
FIG. 5 shows a simulation result of the trajectories of the trunk horizontal position and the trunk vertical position in a gait motion of a robot.
Figure 6:
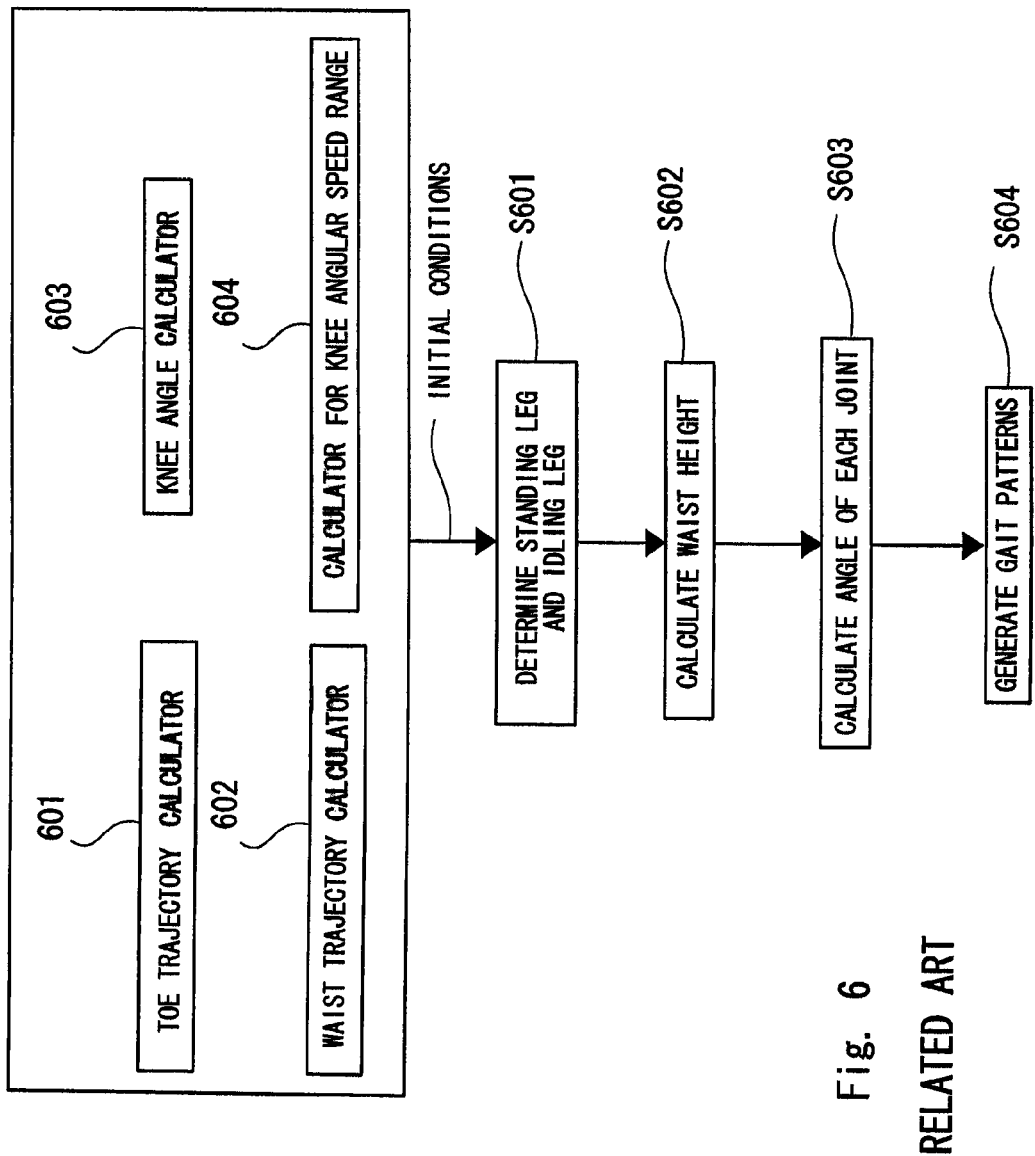
FIG. 6 is a diagram for explaining a control method disclosed in Patent literature 1.
Figure 7:
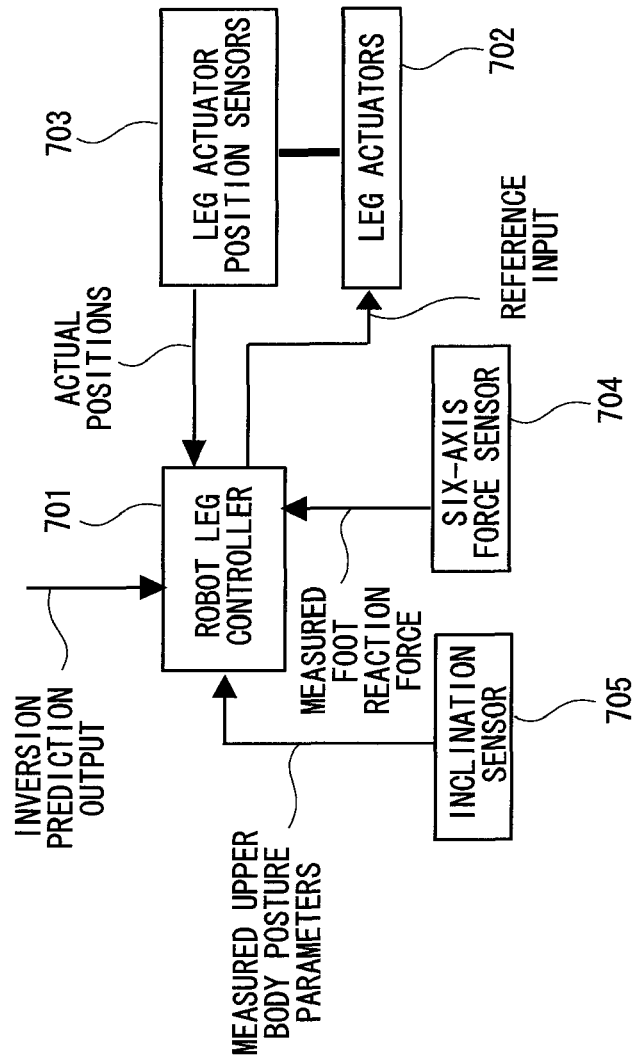
FIG. 7 is a diagram for explaining a control method disclosed in Patent literature 2.

FIGS. 4 and 5 are graphs showing simulation results. FIG. 4 shows a time history of the trunk vertical position y. In FIG. 4, the solid line represents the trunk vertical position y and the dashed line represents the trunk vertical position reference input $r_y$ calculated by Equation (14). Further, the narrow straight lines represent the trunk vertical position lower bound $y_{min}$ and trunk vertical position upper bound $y_{max}$. In FIG. 4, the horizontal axis and the vertical axis indicate the time and the trunk vertical position respectively. It can be seen that the trunk vertical position y is controlled to the values close to the range between the trunk vertical position upper bound $y_{max}$ and the trunk vertical position lower bound $y_{min}$ even though a torque disturbance is applied at a time $t_d$=0.25 [s]. Further, the need to control the trunk vertical position y can be eliminated for one third of the period, implying that the power consumption for each motor can be reduced by one third. That is, the motor current can be reduced.

FIG. 5 shows a trajectory of the trunk position in the vertical and horizontal directions. In FIG. 5, the horizontal axis and the vertical axis indicate the trunk horizontal position and the trunk vertical position respectively. As can be seen from FIG. 5, even when the robot starts to lose its balance, it recovers the balance and travels forward.

With the above-described gait control, it is possible to make the robot walk without tumbling down even when a torque disturbance is applied. Further, the power consumption can be reduced. Furthermore, it is also possible to make the robot walk while avoiding an obstacle located above the robot 101 and protecting the electrical unit from heat from the ground. In this way, the robustness of gait motions can be improved.

In the above-described gait control, the need to create the gait data including reference inputs for each joint angle can be eliminated in advance. Therefore, the memory capacity to be provided in the control unit 141 can be reduced. Even when the robot 101 is equipped with a small memory, the robustness of gait motions can be improved. That is, it is possible to improve the safety for surrounding humans and objects and to reduce the power consumption. For example, it is possible to make the robot walk even when the ground is rough and/or an external force is exerted. Therefore, the above-described gait controller and control method are desirably applied to housekeeping robots, nursing-care robots, rescue robots, and robots working in extreme environments. That is, the above-described gait control can be widely applied to gait control of robots having a plurality of legs for which robust gait stability, extended battery life are required.

This application is based upon and claims the benefit of priority from Japanese patent application No. 2009-103917, filed on Apr. 22, 2009, the disclosure of which is incorporated herein in its entirety by reference.

REFERENCE SIGNS LIST

101 ROBOT
102 HEAD
103 TRUNK
104 WAIST
105 RIGHT ARM
106 LEFT ARM
110 LEGS
120 RIGHT LEG
121 RIGHT HIP JOINT
122 RIGHT THIGH
123 RIGHT KNEE JOINT
124 RIGHT SHANK
125 RIGHT ANGLE JOINT
126 RIGHT FOOT
130 LEFT LEG
131 LEFT HIP JOINT
132 LEFT THIGH
133 LEFT KNEE JOINT
134 LEFT SHANK
135 LEFT ANGLE JOINT
136 LEFT FOOT
141 CONTROL UNIT
151 GROUND, FLOOR SURFACE
201 THIGH ANGULAR SPEED REFERENCE INPUT GENERATOR
202 THIGH ANGULAR SPEED CONTROLLER
203 ANKLE TORQUE UNIT
204 ANKLE MOTOR
205 TRUNK VERTICAL POSITION REFERENCE INPUT GENERATOR
206 KNEE ABSOLUTE ANGLE CONTROLLER
207 KNEE TORQUE UNIT
208 KNEE MOTOR
209 IDLING-LEG ANGLE CONTROLLER
210 IDLING-LEG TORQUE UNIT
211 IDLING-LEG MOTOR
212 ROBOT MECHANISM
213 POSTURE SENSOR
214 ENVIRONMENT SENSOR
601 TOE TRAJECTORY CALCULATOR
602 WAIST TRAJECTORY CALCULATOR
603 KNEE ANGLE CALCULATOR
604 CALCULATOR FOR KNEE ANGULAR SPEED RANGE
701 ROBOT LEG CONTROLLER
702 LEG ACTUATORS
703 LEG ACTUATOR POSITION SENSORS
704 SIX-AXIS FORCE SENSOR
705 INCLINATION SENSOR

The invention claimed is:

1. A robot controller that drives joints of a robot having a plurality of legs to make the robot walk, the robot controller being configured to:
   determine a permissible range for a trunk vertical position of the robot based on measured environmental parameters, the measured environmental parameters being information of an environment around the robot; and
   make the robot walk based on measured posture parameters representing a posture of the robot so that the trunk vertical position remains within the permissible range,
   wherein in order to adjust the trunk vertical position within the permissible range, a trunk vertical position reference input, which is a target value of the trunk vertical position of the robot, is set to the lower bound when the trunk vertical position calculated based on the measured posture parameters is smaller than a lower bound of the permissible range, whereas the trunk vertical position reference input is set to the upper bound when the trunk vertical position is larger than an upper bound of the permissible range, and wherein the measured posture parameters include a thigh angle, a knee angle, and an idling-leg angle of the robot, wherein a target value of a knee absolute angle, which is a sum of a thigh angle and a knee angle of the robot, is used as a knee absolute angle reference input, and the knee absolute angle reference input is a function of the thigh angle of the robot, and the robot controller being further configured to:
obtain the knee absolute angle reference input by subtracting a product of a thigh length and the thigh angle of the robot from the trunk vertical position reference input;
divide the subtracted value by a shank length; and
apply arccosine function to the divided value.

2. The robot controller according to claim 1, comprising:
a thigh angular speed controller that controls a thigh angular speed of the robot;
a knee absolute angle controller that controls a knee absolute angle of the robot; and
an idling-leg angle controller that controls an idling-leg angle of the robot.

3. The robot controller according to claim 1, further comprising:
a thigh angular speed reference input generator that generates a thigh angular speed reference input; and
a trunk vertical position reference input generator that generates a trunk vertical position reference input based on the measured environmental parameters and the measured posture parameters, the trunk vertical position reference input being a target value of the trunk vertical position of the robot.

4. The robot controller according to claim 1, wherein a linear-part torque used to control a linear part of a robot mechanism is calculated, the robot mechanism being a mechanism of the robot.

5. The robot controller according to claim 4, wherein the linear-part torque includes a linear part of ankle torque used to control a thigh angular speed of the robot, a linear part of knee torque used to control a knee absolute angle of the robot, and a linear part of idling-leg torque used to control an idling-leg angle of the robot.

6. The robot controller according to claim 1, further comprising an environment sensor that outputs the measured environmental parameters.

7. The robot controller according to claim 1, further comprising a posture sensor that outputs the measured posture parameters.

8. The robot controller according to claim 1, wherein the idling-leg angle reference input, which is a target value of an idling-leg angle of the robot, is a function of the thigh angle of the robot.

9. The robot controller according to claim 8, wherein the idling-leg angle reference input is obtained by reversing a sign of the thigh angle.

10. A legged robot comprising the robot controller according to claim 1 and a plurality of legs.

11. A robot controller that makes a robot comprising a plurality of legs walk by driving joints of the robot, the robot controller being configured to:
determine a permissible range for a trunk vertical position of the robot based on measured environmental parameters, the measured environmental parameters being information of an environment around the robot; and
make the robot walk based on measured posture parameters representing a posture of the robot so that the trunk vertical position remains within the permissible range,
wherein the measured environmental parameters include a position of an obstacle located above the robot and a ground temperature.

12. The robot controller according to claim 11, the robot controller being further configured to:
set a trunk vertical position reference input upper bound, which is an upper bound of a permissible range of the trunk vertical position according to a position of an obstacle located above the robot, and set a trunk vertical position reference input lower bound, which is a lower bound of the permissible range of the trunk vertical position according to a ground temperature;
set a trunk vertical position reference input to the trunk vertical position reference input lower bound when the trunk vertical position is smaller than the trunk vertical position reference input lower bound, the trunk vertical position reference input being a target value of the trunk vertical position of the robot;
set the trunk vertical position reference input to the trunk vertical position reference input upper bound when the trunk vertical position is larger than the trunk vertical position reference input upper bound; and
set the trunk vertical position reference input to the trunk vertical position when the trunk vertical position is within the permissible range.

13. A robot control method to drive joints of a robot having a plurality of legs to make the robot walk, the robot control method comprising:
determining a permissible range for a trunk vertical position of the robot based on measured environmental parameters, the measured environmental parameters being information of an environment around the robot; and
making the robot walk based on measured posture parameters representing a posture of the robot so that the trunk vertical position remains within the permissible range,
wherein in order to adjust the trunk vertical position within the permissible range, a trunk vertical position reference input, which is a target value of the trunk vertical position of the robot, is set to the lower bound when the trunk vertical position calculated based on the measured posture parameters is smaller than a lower bound of the permissible range, whereas the trunk vertical position reference input is set to the upper bound when the trunk vertical position is larger than an upper bound of the permissible range, and
wherein the measured posture parameters include a thigh angle, a knee angle, and an idling-leg angle of the robot,
wherein a target value of a knee absolute angle, which is a sum of a thigh angle and a knee angle of the robot, is used as a knee absolute angle reference input, and the knee absolute angle reference input is a function of the thigh angle of the robot; and
obtaining the knee absolute reference input by subtracting a product of a thigh length and the thigh angle of the robot from the trunk vertical position reference input;
dividing the subtracted value by a shank length; and
applying arccosine function to the divided value.

14. The robot control method according to claim 13, further comprising generating a trunk vertical position reference input based on the measured environmental parameters and the measured posture parameters, the trunk vertical position reference input being a target value of the trunk vertical position of the robot.

15. The robot control method according to claim 13, wherein a linear-part torque used to control a linear part of a robot mechanism is calculated, the robot mechanism being a mechanism of the robot.

16. The robot control method according to claim 15, wherein the linear-part torque includes a linear part of ankle torque used to control a thigh angular speed of the robot, a linear part of knee torque used to control a knee absolute angle of the robot, and a linear part of idling-leg torque used to control an idling-leg angle of the robot.

17. The robot control method according to claim 13, wherein the idling-leg angle reference input, which is a target value of an idling-leg angle of the robot, is a function of the thigh angle of the robot.

18. The robot control method according to claim 17, wherein the idling-leg angle reference input is obtained by reversing a sign of the thigh angle.

19. A robot control method to make a robot comprising a plurality of legs walk by driving joints of the robot, the robot control method comprising:
   determining a permissible range for a trunk vertical position of the robot based on measured environmental parameters, the measured environmental parameters being information of an environment around the robot; and
   making the robot walk based on measured posture parameters representing a posture of the robot so that the trunk vertical position remains within the permissible range, wherein the measured environmental parameters include a position of an obstacle located above the robot and a ground temperature.

20. The robot control method according to claim 19, further comprising:
   setting a trunk vertical position reference input upper bound, which is an upper bound of a permissible range of the trunk vertical position, according to a position of an obstacle located above the robot, and setting a trunk vertical position reference input lower bound, which is a lower bound of the permissible range of the trunk vertical position according to a ground temperature;
   setting a trunk vertical position reference input to the trunk vertical position reference input lower bound when the trunk vertical position is smaller than the trunk vertical position reference input lower bound, the trunk vertical position reference input being a target value of the trunk vertical position of the robot;
   setting the trunk vertical position reference input to the trunk vertical position reference input upper bound when the trunk vertical position is larger than the trunk vertical position reference input upper bound; and
   setting the trunk vertical position reference input to the trunk vertical position when the trunk vertical position is within the permissible range.

* * * * *

UNITED STATES PATENT AND TRADEMARK OFFICE
CERTIFICATE OF CORRECTION

PATENT NO. : 8,473,102 B2  
APPLICATION NO. : 13/129982  
DATED : June 25, 2013  
INVENTOR(S) : Fukashi Andoh Page 1 of 1

It is certified that error appears in the above-identified patent and that said Letters Patent is hereby corrected as shown below:

In the Specification

Column 11, Equation 4, change "$T_a = T_{a0} + g_h g_k$" to -- $T_a = T_{a0} + g_h - g_k$ --

Column 11, Equation 5, change "$T_k - T_{k0} + g_k$" to -- $T_k = T_{k0} + g_k$ --

Column 14, line 46, change "$q_{kmax} = -0.5\pi/180$" to -- $q_{kmax} = -0.5.\pi/180$ --

Column 15, line 4, change "$C_{hic}$" to -- $q_{hic}$ --

Signed and Sealed this  
Twenty-second Day of October, 2013

Teresa Stanek Rea  
*Deputy Director of the United States Patent and Trademark Office*